(12) United States Patent
Liu et al.

(10) Patent No.: US 10,667,272 B2
(45) Date of Patent: May 26, 2020

(54) DETERMINING MECHANISM OF PHYSICAL SHARED CHANNEL PARAMETERS, BASE STATION, AND USER EQUIPMENT

(71) Applicant: SHARP KABUSHIKI KAISHA, Sakai, Osaka (JP)

(72) Inventors: Renmao Liu, Shanghai (CN); Meng Zhang, Shanghai (CN)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/085,297

(22) PCT Filed: Feb. 13, 2017

(86) PCT No.: PCT/CN2017/073363
§ 371 (c)(1),
(2) Date: Sep. 14, 2018

(87) PCT Pub. No.: WO2017/157115
PCT Pub. Date: Sep. 21, 2017

(65) Prior Publication Data
US 2019/0082441 A1  Mar. 14, 2019

(30) Foreign Application Priority Data

Mar. 15, 2016 (CN) .......................... 2016 1 0146009

(51) Int. Cl.
*H04W 72/04* (2009.01)
*H04L 1/00* (2006.01)
(Continued)

(52) U.S. Cl.
CPC ....... *H04W 72/0493* (2013.01); *H04L 1/0004* (2013.01); *H04L 1/0025* (2013.01);
(Continued)

(58) Field of Classification Search
CPC ......... H04W 72/0493; H04W 72/0453; H04W 4/80; H04W 72/042; H04W 4/70;
(Continued)

(56) References Cited

U.S. PATENT DOCUMENTS

| 10,285,028 B2* | 5/2019 | Chincholi | H04W 4/70 |
| 2015/0195068 A1* | 7/2015 | Kim | H04L 5/0048 |
| | | | 370/329 |

(Continued)

OTHER PUBLICATIONS

Qualcomm Incorporated, New Work Item: NarrowBand IOT (NB-IOT), RP-151621, 3GPP TSG RAN Meeting #69, Phoenix, USA, Sep. 14-16, 2015.
(Continued)

*Primary Examiner* — Jay P Patel
(74) *Attorney, Agent, or Firm* — ScienBiziP, P.C.

(57) ABSTRACT

The present disclosure provides a method executed at a user equipment (UE) and a related UE. The method comprises: receiving, from a base station, parameters of Narrowband Internet of Things (NB-IoT) physical shared channel, wherein the parameters comprising a number of resource units onto which a transport block of an NB-IoT physical shared channel is mapped and a number of repetitions for transmission or reception of the NB-IoT physical shared channel. The method further comprises: interpreting the number of resource units onto which a transport block of the NB-IoT physical shared channel is mapped as a number of physical resource blocks allocated to the NB-IoT physical shared channel, so as to determine a size of a transport block of the NB-IoT physical shared channel; and determining, according to the number of resource units onto which a transport block of the NB-IoT physical shared channel is mapped and the number of repetitions for transmission or reception of the NB-IoT physical shared channel, a total number of resource units for transmission or reception of the (Continued)

NB-IoT physical shared channel. The present disclosure also provides a method corresponding to the above method and is performed at a base station and a related base station.

4 Claims, 8 Drawing Sheets

(51) Int. Cl.
  *H04L 1/08* (2006.01)
  *H04L 5/00* (2006.01)
  *H04W 4/80* (2018.01)
  *H04W 4/70* (2018.01)
(52) U.S. Cl.
  CPC .............. *H04L 1/0075* (2013.01); *H04L 1/08* (2013.01); *H04L 5/0044* (2013.01); *H04W 4/80* (2018.02); *H04W 72/0453* (2013.01); *H04L 5/0053* (2013.01); *H04W 4/70* (2018.02); *H04W 72/042* (2013.01); *Y02D 70/00* (2018.01); *Y02D 70/10* (2018.01); *Y02D 70/12* (2018.01); *Y02D 70/126* (2018.01)
(58) Field of Classification Search
  CPC ....... H04L 1/0004; H04L 5/0044; H04L 1/08; H04L 1/0075; H04L 1/0025; H04L 5/0053; Y02D 70/12; Y02D 70/10; Y02D 70/126; Y02D 70/00
  See application file for complete search history.

(56) References Cited

U.S. PATENT DOCUMENTS

| | | | |
|---|---|---|---|
| 2016/0226649 A1* | 8/2016 | Papasakellariou | H04L 5/0057 |
| 2016/0286555 A1* | 9/2016 | Papasakellariou | H04W 48/12 |
| 2017/0195464 A1* | 7/2017 | Lee | H04L 69/324 |
| 2017/0230780 A1* | 8/2017 | Chincholi | H04W 4/70 |
| 2018/0084572 A1* | 3/2018 | You | H04L 5/14 |
| 2018/0115962 A1* | 4/2018 | Kim | H04W 28/02 |
| 2018/0317198 A1* | 11/2018 | Lee | H04W 4/70 |
| 2018/0367278 A1* | 12/2018 | Chatterjee | H04W 4/70 |
| 2019/0021109 A1* | 1/2019 | Yi | H04W 76/27 |
| 2019/0289626 A1* | 9/2019 | You | H04W 72/1289 |
| 2019/0335428 A1* | 10/2019 | Bendlin | H04W 72/042 |

OTHER PUBLICATIONS

Ericsson, NSN, New Work Item on Even Lower Complexity and Enhanced Coverage LTE UE for MTC, RP-140990, 3GPP TSG RAN Meeting #64, Sophia Antipolis, France, Jun. 10-13, 2014.
3GPP Cellular system support for ultra-low complexity and low throughput Internet of Things (CIoT)(Release 13), 3GPP TR 45.820 V13.1.0.(Nov. 30, 2015).
Sony, "Consideration on NB-PDCCH for NB-IoT", R1-160669, 3GPP TSG RAN WG1 Meeting #84 St Julian's, Malta, Feb. 15-19, 2016.

* cited by examiner

DETERMINING MECHANISM OF PHYSICAL SHARED CHANNEL PARAMETERS, BASE STATION, AND USER EQUIPMENT

TECHNICAL FIELD

The present disclosure relates to the technical field of wireless communication. More specifically, the present disclosure relates to a determining mechanism for physical downlink shared channel (PDSCH) parameters and a corresponding base station and user equipment (UE).

BACKGROUND

With the rapid growth of mobile communication and great progress of technology, the world will move towards a fully interconnected network society where anyone or any device can acquire information and share data anytime and anywhere. It is estimated that there will be billion interconnected equipments by 2020, of which only about 10 billion may be mobile phones and tablet computers. The rest are not machines communicating with human beings but machines communicating with one another. Therefore, how to design a system to better support the Internet of Everything is a subject needing further and intensive study.

In the standard of Long Term Evolution (LTE) of the Third Generation Partnership Project (3GPP), machine-to-machine communication is called machine type communication (MTC). MTC is a data communication service that does not require human participation. Deployment of large-scale MTC user equipments can be used in such fields as security, tracking, billing, measurement and consumer electronics, and specifically relates applications, including video monitoring, supply chain tracking, intelligent meter reading, and remote monitoring. MTC requires lower power consumption and supports lower data transmission rate and lower mobility. The current LTE system is mainly for man-to-man communication services. The key to achieving the competitive scale advantages and application prospects of MTC services is that the LTE network supports low-cost MTC equipments.

In addition, some MTC user equipments need to be installed in the basement of a residential building or at a position within the protection of an insulating foil, a metal window, or a thick wall of a traditional building; MTC suffers from more serious and obvious penetration losses from air interfaces, compared to that of conventional equipment terminals (such as mobile phones and tablet computers) in LTE networks. 3GPP decides to study the project design and performance evaluation of MTC equipments with enhanced additional 20 dB coverage. It should be noted that MTC equipments located at poor network coverage areas have the following characteristics: extremely slow data transmission rates, extremely low latency requirements, and limited mobility. In view of the above characteristics of MTC, the LTE network can further optimize some signaling and/or channels to better support MTC services.

Therefore, at the 3GPP RAN #64 plenary session held in June 2014, a new MTC work item with low complexity and enhanced coverage for Rel-13 was proposed (see non-patent literature: RP-140990 New work Item on Even Lower Complexity and Enhanced Coverage LTE UE for MTC, Ericsson, NSN). In the description of this work item, an LTE Rel-13 system needs to support uplink/downlink 1.4 MHz RF bandwidth for an MTC user equipment to operate at any system bandwidth (for example, 1.4 MHz, 3 MHz, 5 MHz, 10 MHz, 15 MHz, or 20 MHz). The standardization of the work item would be completed at the end of 2015.

In addition, in order to better implement the Internet of Everything, another new work item was proposed at the 3GPP RAN #69 general meeting held in September 2015 (see Non-Patent Document: RP-151621 New Work Item: NarrowBand IoT (NB-IoT)), which we refer to as Narrowband Internet of Things (NB-IoT). In the description of this item, an NB-IoT user equipment (UE) would support 180 kHz RF bandwidth for uplink and downlink.

Figure 1:
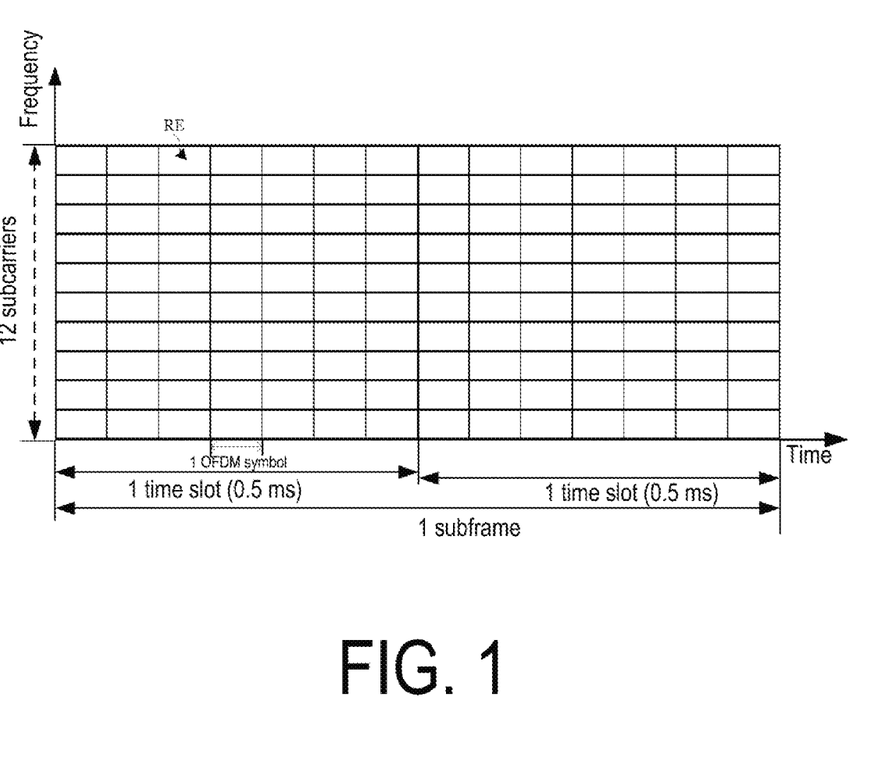
FIG. 1 is a schematic diagram of an LTE subframe in the prior art.

The LTE downlink transmission is based on orthogonal frequency division multiplexing (OFDM). In the LIE system, one radio frame is divided into 10 subframes (#0 to #9). Each subframe may include, for example, 2 timeslots of equal size having a length of 0.5 ms in the time domain, and may include, for example, 12 subcarriers in the frequency domain. Each timeslot includes 7 orthogonal frequency division multiplexing (OFDM) symbols. The OFDM symbols in time and the subcarriers in frequency may be used together for defining resource elements (REs), like time-frequency grids shown in FIG. 1. Each RE corresponds to one subcarrier during an interval of one OFDM symbol. A physical resource block (PRB for short) is also defined in the LTE, where each PRB is composed of 12 consecutive subcarriers during one timeslot. Then, one subframe includes a pair of physical resource blocks, which is also called a physical resource block pair.

In the existing LTE system, the minimum granularity for resource allocation of the UE is one physical resource block or physical resource block pair. That is to say, in the same subframe, a plurality of PRBs (or PRB pairs) may be allocated to a Physical Downlink Shared Channel (PDSCH), an enhanced physical downlink control channel (EPDCCH) or a physical uplink shared channel (PUSCH). However, the NB-IoT UE supports uplink downlink 180 kHz RE bandwidth only, i.e., RF bandwidth having the size of one PRB (or PRB pair). Therefore, in NB-IoT, the physical resources of a narrowband physical shared channel cannot be allocated based on PRBs (or PRB pairs) in a frequency domain.

Therefore, a new resource allocation method for a NB-IoT physical shared channel and a corresponding mechanism for determining channel parameters are desired.

SUMMARY OF INVENTION

In view of the above requirements, according to a first aspect of the present disclosure, a method executed at a user equipment (UE) is provided, comprising: receiving, from a base station, parameters of a Narrowband Internet of Things (NB-IoT) physical shared channel, wherein the parameters comprising a number of resource units onto which a transport block of an NB-IoT physical shared channel is mapped and a number of repetitions for transmission or reception of the NB-IoT physical shared channel. The method further comprises: interpreting the number of resource units onto which a transport block of the NB-IoT physical shared channel is mapped as a number of physical resource blocks allocated to the NB-IoT physical shared channel, so as to determine a size of a transport block of the NB-IoT physical shared channel; and determining, according to the number of resource units onto which a transport block of the NB-IoT physical shared channel is mapped and the number of repetitions for transmission or reception of the NB-IoT physical shared channel, a total number of resource units for transmission or reception of the NB-IoT physical shared channel.

According to a second aspect of the present disclosure, a method executed at a base station is provided, comprising: determining parameters of a Narrowband Internet of Things (NB-IoT) physical shared channel, wherein the parameters comprising a number of resource units onto which a transport block of the NB-IoT physical shared channel is mapped and a number of repetitions for transmission or reception of the NB-IoT physical shared channel. The method further comprises transmitting the parameters to a user equipment (UE), wherein the number of resource units onto which a transport block of the NB-IoT physical shared channel is mapped is interpreted by the UE as a number of physical resource blocks allocated to the NB-IoT physical shared channel.

According to a third aspect of the present disclosure, a UE is provided, comprising a receiving unit and a determination unit. The receiving unit is configured to receive, from a base station, parameters of a Narrowband Internet of Things (NB-IoT) physical shared channel, wherein the parameters comprising a number of resource units onto which a transport block of the NB-IoT physical shared channel is mapped and a number of repetitions for transmission or reception of the NB-IoT physical shared channel. The determination unit is configured to interpret the received number of resource units onto which a transport block of the NB-IoT physical shared channel is mapped as a number of physical resource blocks allocated to the NB-IoT physical shared channel, so as to determine a size of a transport block of the NB-IoT physical shared channel; and determine, according to the received number of resource units onto which a transport block of the NB-IoT physical shared channel is mapped and the number of repetitions for transmission or reception of the NB-IoT physical shared channel, a total number of resource units for transmission or reception of the NB-IoT physical shared channel.

According to a fourth aspect of the present disclosure, a base station is provided, comprising a determination unit and a transmitting unit. The determination unit is configured to determine parameters of a Narrowband Internet of Things (NB-IoT) physical shared channel, wherein the parameters comprising a number of resource units onto which a transport block of the NB-IoT physical shared channel is mapped and a number of repetitions for transmission or reception of the NB-IoT physical shared channel. The transmitting unit is configured to transmit the parameters to a user equipment (UE), wherein the number of resource units onto which a transport block of the NB-IoT physical shared channel is mapped is interpreted by the UE as a number of physical resource blocks allocated to the NB-IoT physical shared channel.

Optionally, the NB-IoT physical shared channel comprises an NB-IoT physical downlink shared channel (NPDSCH) and/or an NB-IoT physical uplink shared channel (NPUSCH).

Optionally, the number of resource units onto which a transport block of the NB-IoT physical shared channel is mapped is dynamically indicated by downlink control information (DCI).

Optionally, a basic unit for repeated transmission or reception of the NB-IoT physical shared channel is the number of resource units onto which a transport block resource of the NB-IoT physical shared channel is mapped.

Optionally, the total number of resource units for transmission or reception by the NB-IoT physical shared channel is equal to a number of repetitions for transmission or reception of the NB-IoT physical shared channel multiplied by the number of resource units onto which a transport block of the NB-IoT physical shared channel is mapped.

Optionally, a total number of subframes for transmission or reception of the NB-IoT physical shared channel is equal to a product of a number of repetitions for transmission or reception of the NB-IoT physical shared channel, the number of resource units onto which a transport block of the NB-IoT physical shared channel is mapped, and a number of subframes comprised in each resource unit.

BRIEF DESCRIPTION OF DRAWINGS

The above and other features of the present disclosure will become more apparent with the following detailed description in conjunction with the accompanying drawings.

DESCRIPTION OF EMBODIMENTS

The following describes the present disclosure in detail with reference to the accompanying drawings and specific embodiments. It should be noted that the present disclosure is not limited by these specific embodiments. In addition, for simplicity, a detailed description of a known art not directly related to the present disclosure is omitted to prevent confusion in understanding the present disclosure.

Multiple embodiments according to the present disclosure are specifically described below by using an LTE mobile communications system and its subsequent evolved version as an exemplary application environment. However, it is to be noted that the present disclosure is not limited to the following embodiments, but may be applied to other wireless communication systems, such as a future 5G cellular communication system.

The base stations and user equipments mentioned in the following embodiments of the present disclosure all refer to narrowband Internet of Things (NB-IoT) base stations and user equipments. As described before, these NB-IoT user equipments support uplink/downlink 180 KHz RF bandwidth.

As used herein, an NB-IoT PDSCH is referred to simply as NB-PDSCH (or NPDSCH); as NB-IoT PDCCH is referred to simply as NB-PDCCH (or NPDCCH); and an NB-IoT PUSCH is referred to simply as NB-PUSCH (or NPUSCH). An NB-IoT physical shared channel may be an NB-PDSCH and/or an NB-PUSCH.

Figure 2:
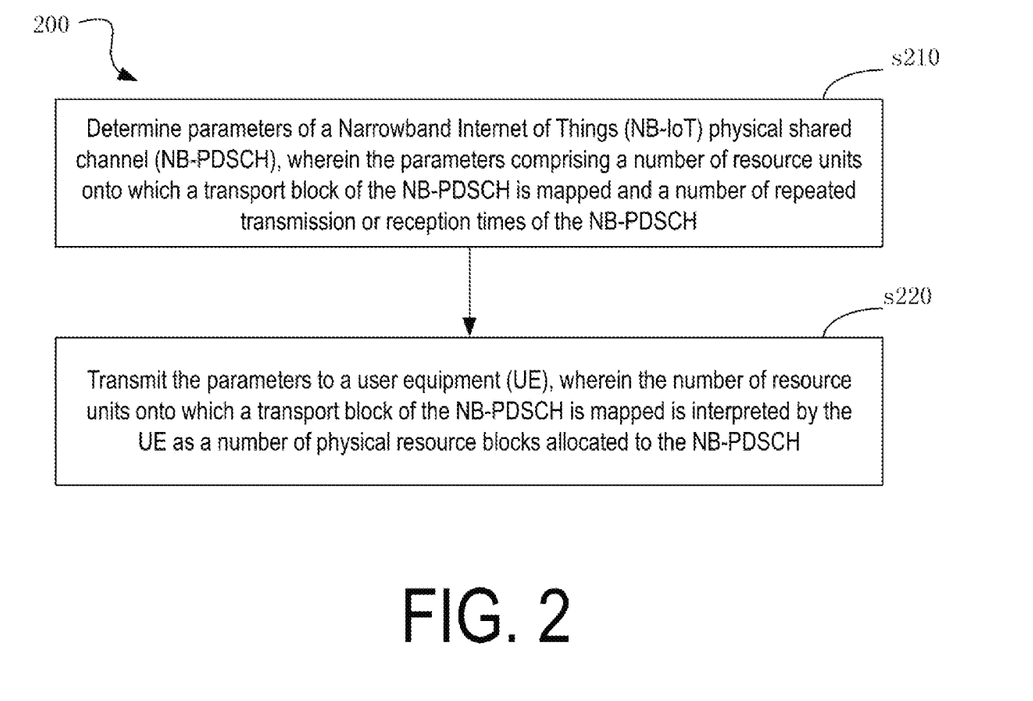
FIG. 2 is a flowchart of a method executed at a base station according to an embodiment of the present disclosure.

FIG. 2 is a flowchart of a method 200 executed at a base station according to an embodiment of the present disclosure. As shown in the figure, the method 200 includes determining, in step s210, parameters for an NB-PDSCH. The parameters include a number of resource units onto Which a transport block of the NB-PDSCH is snapped and a number of repetitions for transmission or reception of the NB-PDSCH. A basic unit for repeated transmission or reception of the NB-PDSCH is the number of resource units onto which the transport block is mapped. For example, if the number of resource units onto which a current transport block (TB) is mapped is 4, a basic unit for repeated transmission or reception of a current NB-PDSCH is 4 resource units.

The method 200 further includes transmitting, in step s220, the parameters to a UE, wherein the number of resource units onto which a transport block of the NB-PDSCH is mapped is interpreted by the UE as a number of physical resource blocks allocated to the NB-PDSCH.

Figure 3:
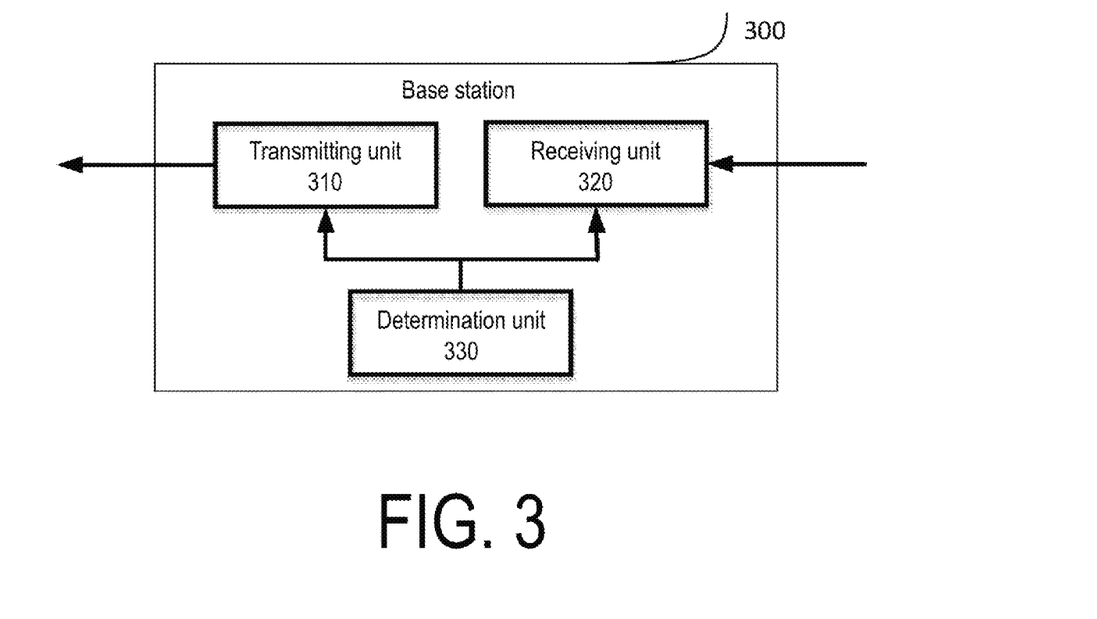
FIG. 3 is a block diagram of a base station according to an embodiment of the present disclosure.

FIG. 3 is a block diagram of a base station 300 according to an embodiment of the present disclosure. As shown in the figure, the base station 300 includes a transmitting unit 310, a receiving unit 320, and a determination unit 330. Those skilled in the art should understand that the base station 300 may also include other functional units needed for implementing its functions, such as various processors, memories, RF signal processing units, baseband signal processing units, and other physical downlink channel transmission processing units. However, for the sake of conciseness, detailed descriptions of these well-known elements are omitted.

The determination unit 330 determines, based on the NB-IoT physical downlink channel quality and a size of a transport block of the NB-PDSCH that is to be sent, the number of resource units onto which the TB is mapped and/or the number of repetitions for NB-PDSCH transmission. The basic unit for repeated transmission or reception of the NB-PDSCH is the number of resource units onto which the transport block is mapped. For example, if the number of resource units onto which a current TB is mapped is 4, a basic unit for repeated transmission of a current NB-PDSCH is 4 resource units.

In addition, the determination unit 330 determines, based on the NB-IoT physical uplink channel quality and a size of a transport block of the PUSCH that is to be sent, the number of resource units onto which the TB is mapped and/or the number of repetitions for NB-PUSCH transmission. A basic unit for repeated transmission of an NB-PDSCH is the number (or a transmission time interval (TTI) length) of resource units onto which the TB is mapped. For example, if the number of resource units onto which a current TB is mapped is 4, a basic unit for repeated transmission of a current NB-PDSCH is 4 resource units.

The transmitting unit 310 transmits the parameters to the UE.

In addition, the transmitting unit 310 transmits an NB-PDSCH according to the parameters determined by the determination unit 330.

The receiving unit 320 receives an NB-PUSCH according to the parameters determined by the determination unit 330.

Figure 4:
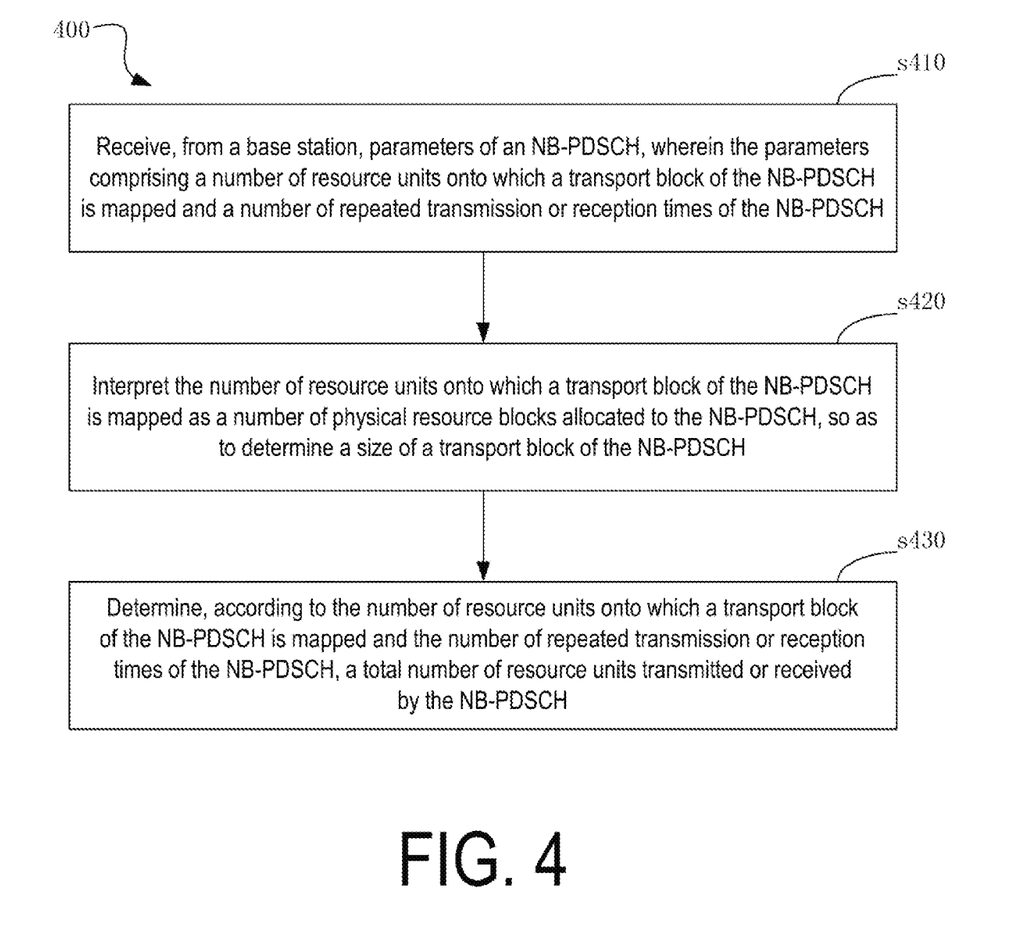
FIG. 4 is a flowchart of a method executed at a UE according to an embodiment of the present disclosure.

FIG. 4 is a flowchart of a method 400 executed at a UE according to an embodiment of the present disclosure. As shown in the figure, the method 400 includes receiving, in step s410, parameters for an NB-PDSCH from a base station. The parameters include a number of resource units onto which a transport block of the NB-PDSCH is mapped and a number of repetitions for transmission or reception of the NB-PDSCH. In step s420, the number of resource units onto which a transport block of the NB-PDSCH is mapped as a number of physical resource blocks allocated to the NB-PDSCH, so as to determine a size of a transport block of the NB-PDSCH. In step s430, according to the number of resource units onto which a transport block of the NB-PDSCH is mapped and the number of repetitions for transmission or reception of the NB-PDSCH, a total number of resource units for transmission or reception of the NB-PDSCH is determined.

Figure 5:
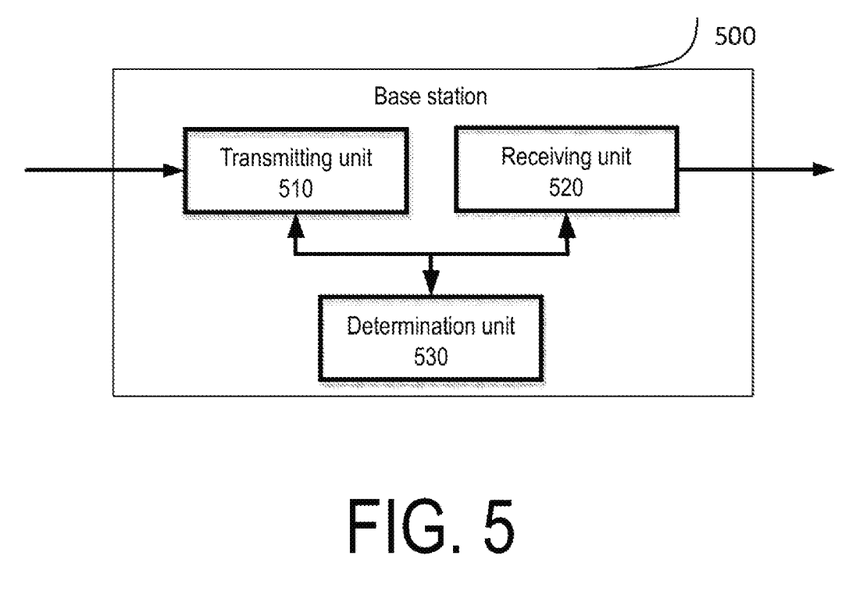
FIG. 5 is a block diagram of UE according to an embodiment of the present disclosure.

FIG. 5 is a block diagram of UE 500 according to an embodiment of the present disclosure. As shown in the figure, the UE 500 includes a receiving unit 510, a transmitting unit 520, and a determination unit 530. Those skilled in the art should understand that the UE 500 may also include other functional units needed for implementing its functions, such as various processors, memories, RF signal processing units, baseband signal processing units, and other physical uplink channel transmission processing units. However, for the sake of conciseness, detailed descriptions of these well-known elements are omitted.

The receiving unit 510 receives parameters for an NB-PDSCH from a base station. The parameters include a number of resource units onto which a transport block of the NB-PDSCH is mapped and a number of repetitions for transmission or reception of the NB-PDSCH.

The determination unit 530 determines the size of a received transport block of the NB-PDSCH based on the received number of resource units for an NB-PDSCH and a modulation and coding scheme (MCS) index. The number of resource units onto which a transport block of the NB-PDSCH is mapped is interpreted as the number of physical resource blocks allocated to the NB-PDSCH, so as to determine the size of the transport block of the NB-PDSCH. In addition, the determination unit 530 further determines the received number of resource units for the NB-PDSCH based on the received number of resource units for an NB-PDSCH and the number of repetitions for NB-PDSCH transmission, determining how many resource units are needed for receiving an NB-PDSCH.

In addition, the determination unit 530 determines, based on the received number of resource units for an NB-PUSCH and an MCS index, the size of a TB of an NB-PUSCH that needs to be transmitted. The number of resource units onto which a transport block of the NB-PUSCH is mapped is interpreted as the number of physical resource blocks allocated to the NB-PUSCH, so as to determine the size of the transport block of the NB-PUSCH. In addition, the determination unit 530 further determines, based on the received number of resource units for the NB-PUSCH and the number of repetitions for NB-PUSCH transmission, the number of resource units used for NB-PUSCH transmission, i.e., determining how many resource units are needed for transmitting an NB-PUSCH.

The receiving unit 510 receives an NB-PDSCH according to the parameters determined by the determination unit 530.

The transmitting unit 520 transmits an NB-PUSCH according to the parameters determined by the determination unit 530.

Two embodiments are used below to describe a downlink scenario and an uplink scenario respectively.

Embodiment 1

A downlink is a process during which a base station performs transmission and UE performs reception.

The base station determines a transport block index $I_{TBS}$ (or an MCS index $I_{MCS}$) for an NB-PDSCH based on the physical downlink channel quality; and then the number ($N_{PRB}$) of physical resource blocks allocated to an NB-PDSCH is obtained by using a transport block size (the number of bits) in an NB-PDSCH based on Table 1 below.

Table 7.1.7.2.1-1 in Section 7.1.7.2.1 in the non-patent document 3GPP TS 36.213 V12.8.0 (2015-12) is used as Table 1 herein. That is, a transport block size table in the existing LTE standards is used as the transport block size table for an NB-PDSCH; and no changes are needed. Alternatively, a new transport block size table for an NB-PDSCH may be specially designed for NB-IoT.

TABLE 1

TB Size Table

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 175 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 424 | 504 | 600 | 712 | 808 | 936 | 1032 |
| 7 | 104 | 224 | 328 | 504 | 584 | 712 | 840 | 968 | 1096 | 1224 |
| 8 | 120 | 256 | 392 | 584 | 680 | 808 | 968 | 1096 | 1256 | 1384 |
| 9 | 136 | 296 | 456 | 680 | 776 | 936 | 1096 | 1256 | 1416 | 1544 |
| 10 | 144 | 328 | 504 | 776 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3752 | 4264 | 4968 | 5544 | 5992 |
| 25 | 616 | 1256 | 1864 | 2536 | 3112 | 4008 | 4392 | 5160 | 5736 | 6200 |
| 26 | 712 | 1480 | 2216 | 2984 | 3752 | 4264 | 5160 | 5992 | 6712 | 7480 |
| 26A | 632 | 1288 | 1928 | 2600 | 3240 | 3880 | 4584 | 5160 | 5992 | 6456 |

The NB-IoT UE only supports uplink/downlink 180 kHz RE bandwidth, i.e., RF bandwidth with a size of one PRB (or one PRB pair). In 3GPP RAN1#84 Meeting held in Malta in February 2016, it was agreed that a physical resource smaller than one PRB allocated to an NB-PDSCH is not supported in LTE Release 13. Therefore, only a physical resource having a size equal to one PRB can be allocated to an NB-PDSCH at a time. That is, the resource unit used for NB-PDSCH resource allocation is one PRB pair. When it is obtained from Table 1 that the number ($N_{PRB}$) of physical resource blocks allocated to an NB-PDSCH is greater than one PRB (or one PRB pair), $N_{PRB}$ PRB pairs can correspond to $N_{PRB}$ subframes (or $N_{PRB}$ resource units) in a time domain. NB-PDSCH transport blocks are then mapped onto $N_{PRB}$ subframes (or $N_{PRB}$ resource units) in a time domain, so as to support transmission of an NB-PDSCH having a low code rate and a large TB. In the time domain, multiple subframes (or multiple resource units) used for TB mapping may be referred to as a transmission time interval (TTI) length.

Figure 6:
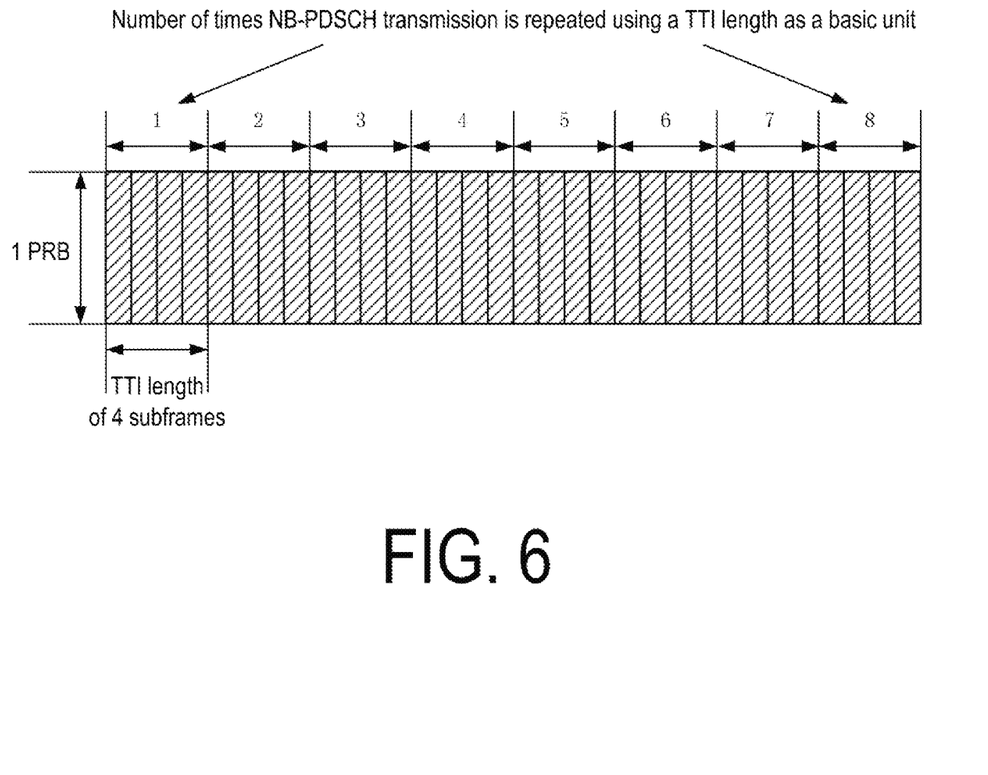
FIG. 6 is an example of repeated transmission of a transport block of an NB-PDSCH according to an embodiment of the present disclosure.

Meanwhile, the base station needs to determine the number of repetitions for NB-PDSCH transmission. A basic unit for repeated transmission of an NB-PDSCH is multiple subframes (or multiple resource units) used for NB-PDSCH transport block mapping. That is, the NB-PDSCH transport blocks are mapped onto multiple subframes (or multiple resource units); and the multiple subframes (or multiple resource units) are used as a basic unit for multiple repeated transmission. As shown in FIG. 6, the number of repeated transmission of an NB-PDSCH is 8; and the number of subframes (or resource units) onto which a transport block of an NB-PDSCH is mapped is 4. In this way, the total transmission duration for an NB-PDSCH is 32 subframes (or 32 resource units) (8*4).

The base station transmits to the UE by using an NB-PDCCH parameters such as the transport block index $I_{TBS}$ (or an MCS index $I_{MCS}$) of an NB-PDSCH, the number of subframes (or resource units) onto which the transport block of an NB-PDSCH is mapped, and the number of repetitions for NB-PDSCH transmission.

The UE receives the NB-PDCCH to obtain the parameters such as the transport block index has (or the MCS index $I_{MCS}$) of the NB-PDSCH, the number of subframes (or resource units) used for NB-PDSCH transport block mapping, and the number of repetitions for NB-PDSCH transmission. The UE interprets the number of subframes (or resource units)) used for NB-PDSCH transport block mapping as the number of PRBs (i.e., $N_{PRB}$) allocated to an NB-PDSCH in a frequency domain. A transport block size in an NB-PDSCH is obtained by using the NB-PDSCH transport block index $I_{TBS}$ (or the MCS index $I_{MCS}$) and $N_{PRB}$ based on Table 1.

The UE obtains the total number of transmitted subframes in a time domain (or the total number of transmitted resource units in a time-frequency domain) for an NB-PDSCH by using the number of subframes (or resource units) onto which an NB-PDSCH is mapped and the number of repetitions for NB-PDSCH transmission. A basic unit for repeated reception of an NB-PDSCH is multiple subframes (or resource units) used for NB-PDSCH transport block mapping. That is, NB-PDSCH transport blocks are mapped onto multiple subframes resource units), and the multiple subframes (or resource units) are then used as a basic unit for multiple repeated transmission. As shown in FIG. 6, the number of repeated transmission of an NB-PDSCH is 8; and the number of subframes (or resource units) onto which a transport block of an NB-PDSCH is mapped is 4. In this way, the UE receives an NB-PDSCH on 32 subframes (or resource units).

The UE receives NB-PDSCH data and/or signaling by using transmission parameters for an NB-PDSCH obtained by an NB-PDCCH.

Embodiment 2

An uplink is a process during which a base station performs reception and UE performs transmission.

Figure 7:
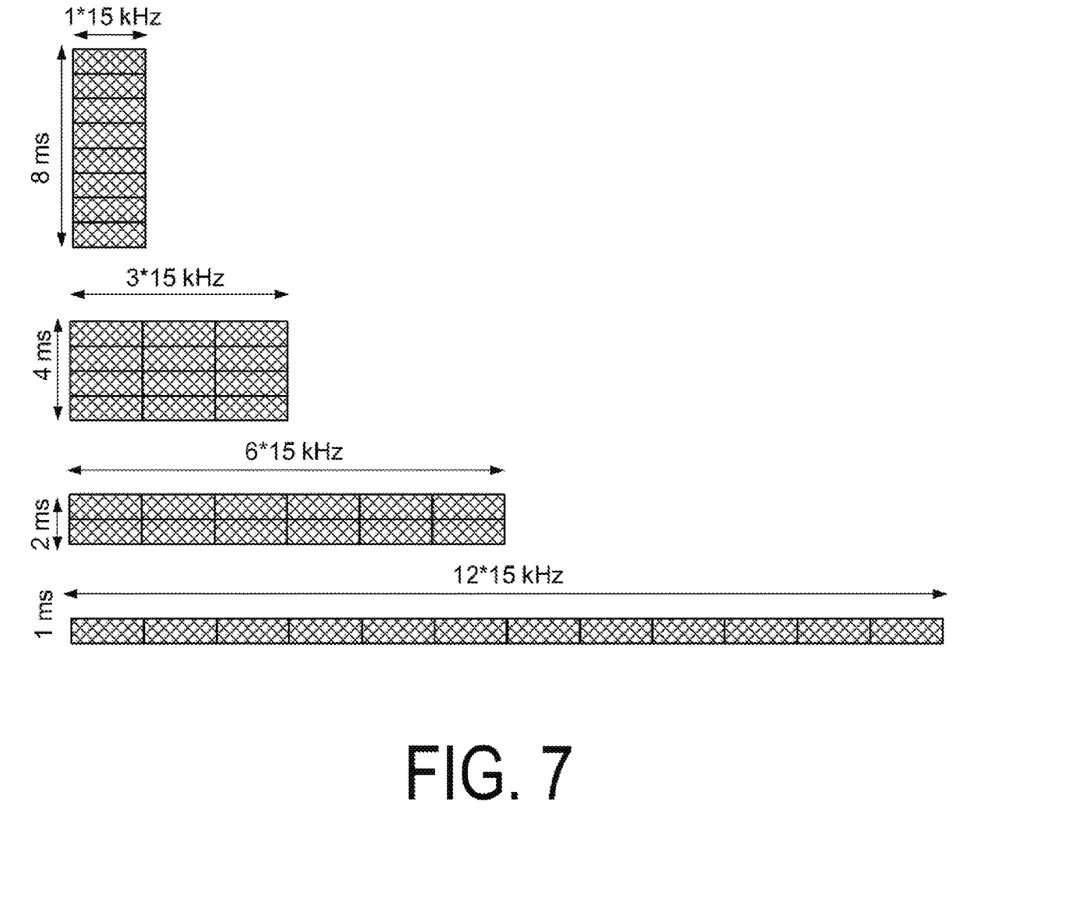
FIG. 7 shows four resource allocation units for an NB-PUSCH.

For an NB-PUSCH, in the 3GPP RAN1 NB IoT Ad Hoc Meeting held in Budapest, Hungary in January 2016, the following agreement has been reached: in a frequency domain, a resource allocation unit of an NB-PUSCH can be less than one PRB. That is, the number of subcarriers may be used as a unit to allocate a resource to an NB-PDSCH. The number of subcarriers is 1, 3, 6, or 12. Correspondingly, the number of subframes allocated in a time domain is 8, 4, 2, and 1 respectively. When one subcarrier is allocated to an NB-PDSCH, a subframe length in a time domain of the NB-PUSCH is 8 subframes. When 3 subcarriers are allocated to an NB-PUSCH, a subframe length in a time domain of the NB-PUSCH is 4 subframes. When 6 subcarriers are allocated to an NB-PUSCH, a subframe length in a time domain of the NB-PUSCH is 2 subframes. When 12 subcarriers are allocated to an NB-PUSCH, a subframe length in a time domain of the NB-PUSCH is 1 subframe. FIG. 7 shows four resource units for resource allocated to an NB-PUSCH when an uplink subcarrier interval is 15 kHz.

Therefore, for 3, 6, and 12 subcarriers, the resource unit of the time-frequency 2-dimensional resource allocation of the NB-PUSCH is equal to the size of one PRB pair. That is, the number of REs included in a resource unit in time-frequency 2-dimensional resource allocation of an NB-PUSCH is equal to the number of REs (168 Res) included in one PRB pair. For one subcarrier, the number of REs (112 REs) included in a resource unit in time-frequency 2-dimensional resource allocation of an NB-PUSCH is less than the number of REs (168 REs) included in one PRB pair, and is ⅔ of the number of REs included in one PRB pair. Therefore, a TB size table of an NB-PUSCH resource allocation unit in which the number of subcarriers is 1 can be redesigned with one resource unit including 112 REs. For ease of description below, the TB size table of Table 1 will be used for an NB-PUSCH in general.

The base station determines a TB index $I_{TBS}$ an MCS index $I_{MCS}$ for an NB-PUSCH based on physical uplink channel quality; and the number ($N_{PRB}$) of physical resource blocks allocated to an NB-PUSCH is then obtained by using a transport block size (the number of bits) in an NB-PUSCH based on Table 1. Table 7.1.7.2.1-1 in Section 7.1.7.2.1 in the non-patent document 3GPP TS 36.213 V1.2.8.0 (2015-12) is used as Table 1 herein. That is, a transport block size table in the existing LTE standards is used as the transport block size table for an NB-PUSCH; and no changes are needed. Alternatively, a new transport block size table for an NB-PUSCH may be specially designed for NB-IoT.

The NB-IoT UE supports uplink/downlink 180 kHz RF bandwidth only, i.e., RF bandwidth having the size of one PRB (or one PRB pair). As can be seen from the foregoing, 4 NB-PUSCH resource allocation units (as shown in FIG. 7) have been defined in the 3GPP RAN1 NB IoT Ad Hoc Meeting held in Budapest, Hungary in January 2016. Therefore, a resource unit in NB-PUSCH resource allocation can be a physical resource having the size of one PRB pair (as described above, when there is one subcarrier; the number of REs included in a resource unit in NB-PUSCH resource allocation is ⅔ of that of REs included in one PRB pair). For the other three subcarriers, the number of REs included in a resource unit in NB-PUSCH resource allocation is equal to that of REs included in one PRB pair. For ease of description, a TB size table in Table 1 is generally used. When it is obtained from Table 1 that the number $N_{PRB}$ of physical resource blocks allocated to an NB-PUSCH is greater than one PRB (or one PRB pair), $N_{PRB}$ PRB pairs can correspond to $N_{PRB}$ NB-PUSCH resource units in a time-frequency domain. NB-PUSCH TBs are then mapped onto $N_{PRB}$ resource units in the time-frequency domain, so as to support transmission of an NB-PUSCH having a low code rate and a large TB. In the time domain, the number of subframes included in multiple resource units ($N_{PRB}$ resource units) used for TB mapping may be referred to as a TTI length of an NB-PUSCH.

Figure 8:
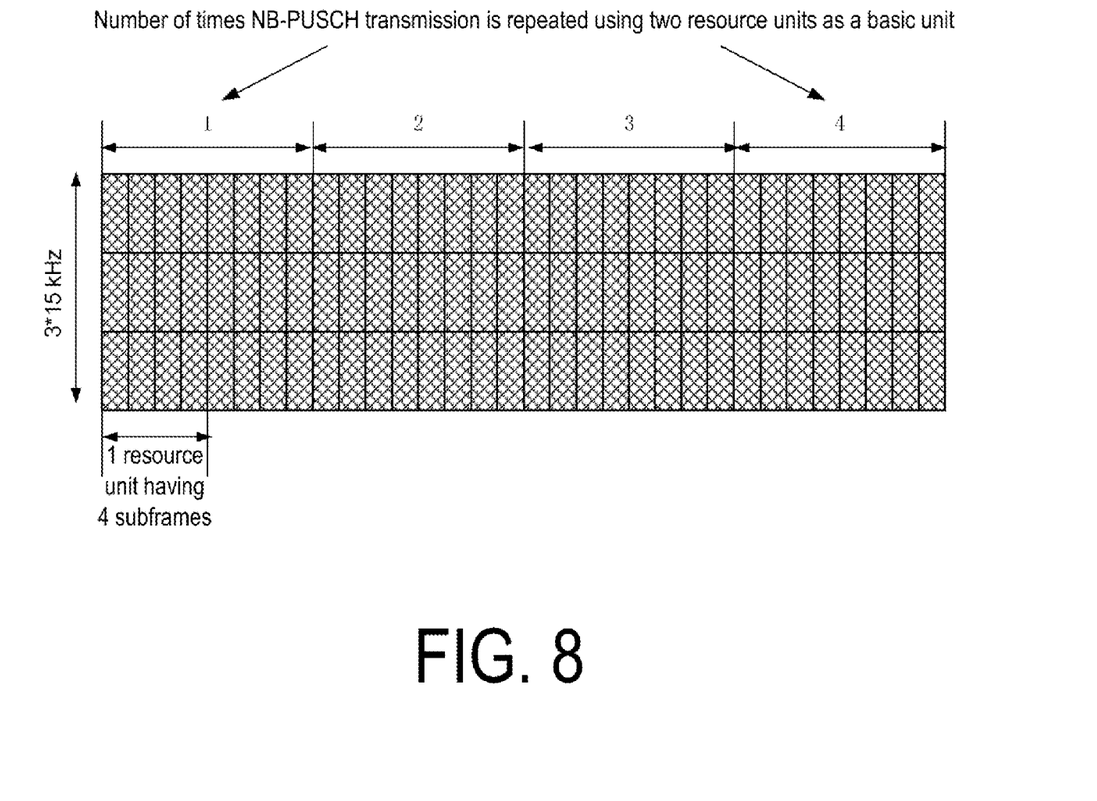
FIG. 8 shows an example of repeated transmission of a transport block of an NB-PUSCH according to an embodiment of the present disclosure.

Meanwhile, the base station needs to determine the number of repetitions for NB-PUSCH transmission. A basic unit for repeated transmission of an NB-PUSCH is multiple resource units ($N_{PRB}$ resource units) used for NB-PUSCH TB mapping. That is, NB-PUSCH transport blocks are mapped onto multiple resource units ($N_{PRB}$ resource units); and the multiple resource units ($N_{PRB}$ resource units) are used as a basic unit for multiple repeated transmission. As shown in FIG. 8, an NB-PUSCH resource unit having the number of subcarriers as 3 and the number of subframes as 4 is used as an example. The number of repeated transmission of an NB-PUSCH is 4, and the number of resource units onto which a transport block of an NB-PUSCH is mapped is 2. In this way, the total number of resources allocated to an NB-PUSCH is 8 (2*4), and the total transmission duration is 32 subframes (2*4*4).

The base station transmits to the UE by using an NB-PDCCH parameters such as the transport block index tins an MCS index $I_{MCS}$) of an NB-PUSCH, the number of resource units used for NB-PUSCH transport block mapping, and the number of repetitions for NB-PUSCH transmission.

The UE receives the NB-PDCCH to obtain the parameters such as the transport block index $I_{TBS}$ (or the MCS index $I_{MCS}$) of the NB-PUSCH, the number of resource units used for NB-PUSCH transport block mapping, and the number of repetitions for NB-PUSCH transmission. The UE interprets the number of resource units used for NB-PUSCH transport block mapping as the number (i.e., $N_{PRB}$) of PRBs allocated to an NB-PUSCH in a frequency domain. A transport block size in an NB-PUSCH is obtained by using the NB-PUSCH transport block index $I_{TBS}$ (or the MCS index $I_{MCS}$) and $N_{PRB}$ based on Table 1.

The UE obtains the total number of transmission resource units in a time-frequency domain for an NB-PUSCH by using the number of resource units used for NB-PUSCH transport block mapping and the number of repetitions for NB-PDSCH transmission. A basic unit for repeated transmission of an NB-PUSCH is multiple resource units ($N_{PRB}$ resource units) used for NB-PUSCH TB mapping. That is, NB-PUSCH transport blocks are mapped onto multiple resource units ($N_{PRB}$ resource units); and the multiple resource units ($N_{PRB}$ resource units) are used as a basic unit for multiple repeated transmission. As shown in FIG. 8, the number of repetitions for NB-PUSCH transmission is 4; and the number of resource units onto which an NB-PUSCH TB is mapped is 2. In this way, the UE transmits an NB-PUSCH on 8 subframes (2*4), and the total transmission duration for an NB-PUSCH is 32 subframes (2*4*4).

The UE transmits NB-PUSCH data and/or signaling by using transmission parameters for an NB-PUSCH obtained by an NB-PUCCH.

The methods and related devices according to the present disclosure have been described above in conjunction with preferred embodiments. It should be understood by those skilled in the art that the methods shown above are only exemplary. The method according to the present disclosure is not limited to steps or sequences shown above. The network node and UE shown above may include more modules; for example, the network node and UE may further include modules that can be developed or developed in the future to be applied to a base station or UE, and the like. Various identifiers shown above are only exemplary, but not for limiting the present disclosure; and the present disclosure is not limited to specific cells described as examples of these identifiers. A person skilled in the art can make various alterations and modifications according to the teachings of the illustrated embodiments.

It should be understood that the above embodiments of the present disclosure may be implemented through software, hardware, or a combination of software and hardware. For example, various components of the base station and user equipment in the above embodiments can be realized through multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving, and transmitting functions. The term "user equipment" refers to a user mobile terminal, such as a terminal device that can perform wireless communication with a base station or a micro base station, including a mobile phone, a notebook, or the like.

In addition, the embodiments disclosed herein may be implemented on a computer program product. More specifically, the computer program product is a product provided with a computer-readable medium having computer program logic encoded thereon. When performed on a computing device, the computer program logic provides related operations to implement the above-described technical solutions of the present disclosure. When being executed on at least one processor of a computing system, the computer program logic enables the processor to perform the operations (methods) described in the embodiments of the present disclosure. Such an arrangement of the present disclosure is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present disclosure.

In addition, each functional module or each feature of the base station equipment and the terminal equipment used in each of the above embodiments may be implemented or executed by a circuit, which is usually one or more integrated circuits. Circuits designed to perform various functions described in this description may include general purpose processors, digital signal processors (DSPs), application specific integrated circuits (ASICs) or general purpose integrated circuits, field programmable gate arrays (FPGAs) or other programmable logic devices, discrete gates or transistor logic, or discrete hardware components, or any combination of the above. The general purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges because of advances in semiconductor technology, the present disclosure may also use integrated circuits obtained using this advanced technology.

Although the present disclosure has been shown in connection with the preferred embodiments disclosed herein, it will be understood by those skilled in the art that various modifications, substitutions, and alterations may be made therein without departing from the spirit and scope of the present disclosure. Accordingly, the present disclosure should not be defined by the above-described embodiments, but should be defined by the appended claims and their equivalents.

The program running on the device according to the present invention may be a program that enables the computer to implement the functions of the present invention by controlling the central processing unit (CPU). The program or information processed by the program can be stored temporarily in a volatile memory (e.g., RAM), a hard disk drive (HDD), a non-volatile memory (e.g., a flash memory), or other memory systems.

The program for implementing the functions of the embodiments of the present invention may be recorded on a computer readable recording medium. The corresponding functions can be implemented by enabling a computer system to read programs recorded on the recording medium and executing them. The so-called "computer system" herein may be a computer system embedded in the device, which may include operating systems or hardware (e.g., peripherals). A "computer readable recording medium" may be a semiconductor recording medium, an optical recording medium, a magnetic recording medium, a recording medium for a short-time dynamic memory program, or any other recording medium readable by a computer.

Various features or functional modules of the apparatus used in the above embodiments may be implemented or executed by circuitry (e.g., monolithic or multi-chip integrated circuits). Circuits designed to perform various functions described in this description may include general purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, an existing processor, a controller, a microcontroller, or a state machine. The circuit can be a digital circuit or an analog circuit. With the development of semiconductor technology, new integrated circuit technologies that can replace existing integrated circuits have emerged; and the present invention can also be implemented by using these new integrated circuit technology.

Furthermore, the present invention is not limited to the embodiments described above. Although various examples of the embodiments have been described, the invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal equipment or communication equipment.

As mentioned above, the embodiments of the present invention have been described in detail with reference to the accompanying drawings. However, the specific structures are not limited to the above embodiments; and the present invention also includes any design modifications that do not depart from the theme of the present invention. Furthermore, various modifications of the present invention may be made within the scope of the claims, and embodiments obtained by appropriate combinations of the technical means disclosed in different embodiments also fall within the scope of the present invention. In addition, components with the same effect described in the above examples may be replaced with one another.

The invention claimed is:

1. A user equipment (UE), comprising:
   determination circuitry configured to determine a transport block size (TBS) for an NB-IoT physical downlink shared channel (NPDSCH) based on at least a first number of subframes determined by Narrowband Physical Downlink Control Channel (NPDCCH) and
   determine a second number of subframes for NPDSCH reception which is equal to a repetition number times the first number of subframes,
   wherein the repetition number is determined by NPDCCH.

2. A method executed at a user equipment (UE), comprising:
   determining a transport block size (TBS) for an NB-IoT physical downlink shared channel (NPDSCH) based on at least a first number of subframes determined by Narrowband Physical Downlink Control Channel (NPDCCH) and
   determining a second number of subframes for NPDSCH reception which is equal to a repetition number times the first number of subframes,
   wherein the repetition number is determined by NPDCCH.

3. A base station comprising:
   transmission circuitry configured to transmit information indicating a first number of subframes and a repetition number by Narrowband Physical Downlink Control Channel (NPDCCH), wherein
   the first number of subframes is used to determine a transport block size (TBS) for an NB-IoT physical downlink shared channel (NPDSCH), and
   a second number of subframes for NPDSCH transmission is equal to the repetition number times the first number of subframes.

4. A method executed at base station comprising:
   transmitting information indicating a first number of subframes and a repetition number by Narrowband Physical Downlink Control Channel (NPDCCH), wherein
   the first number of subframes is used to determine a transport block size (TBS) for an NB-IoT physical downlink shared channel (NPDSCH), and
   a second number of subframes for NPDSCH transmission is equal to the repetition number times the first number of subframes.

* * * * *